Figure 1:
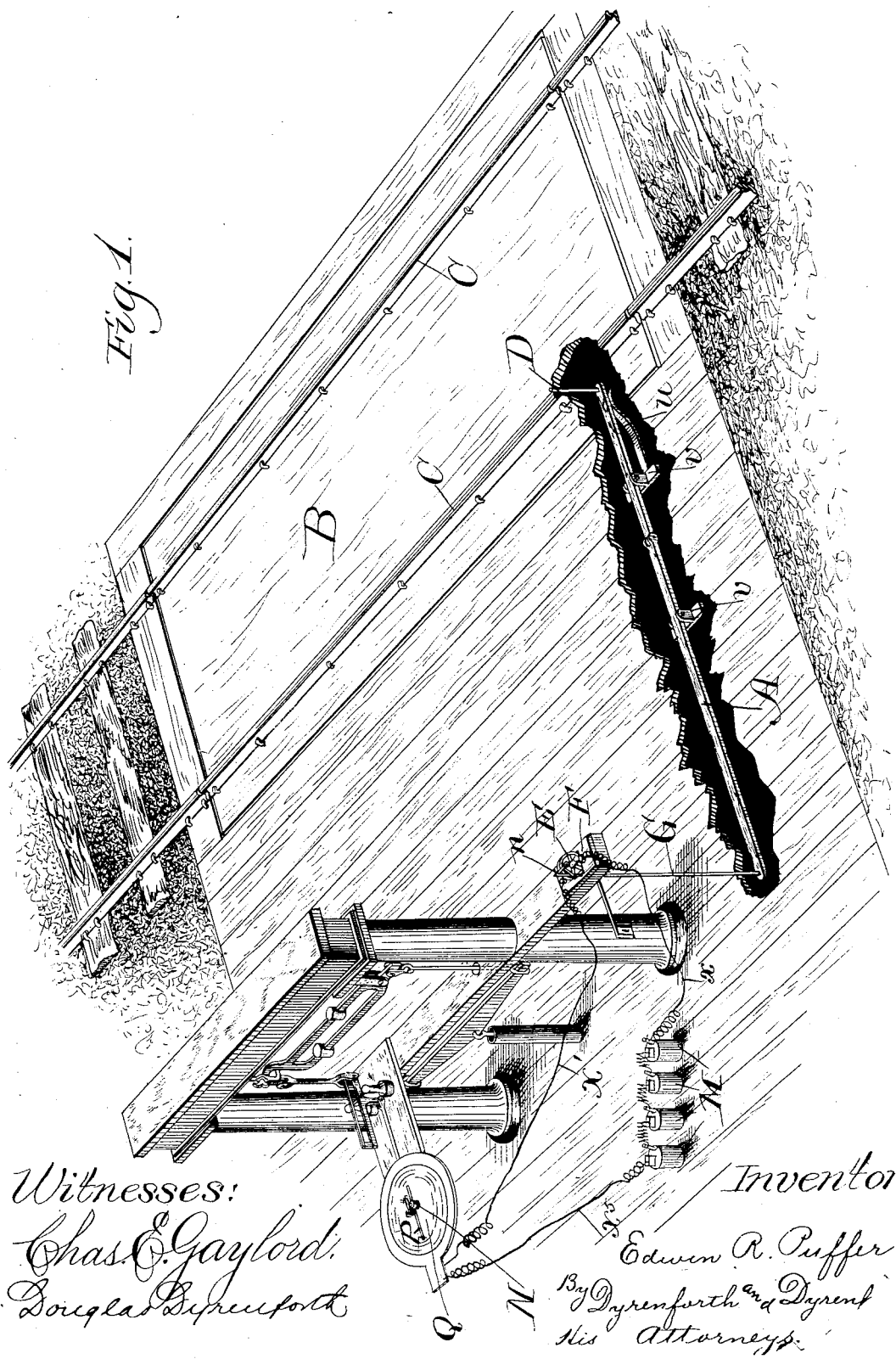

(No Model.)  4 Sheets—Sheet 1.
E. R. PUFFER.
SCALE.
No. 308,195. Patented Nov. 18, 1884.

Witnesses:
Chas. E. Gaylord.
Douglas Dyrenforth

Inventor.
Edwin R. Puffer
By Dyrenforth and Dyrenforth
His Attorneys.

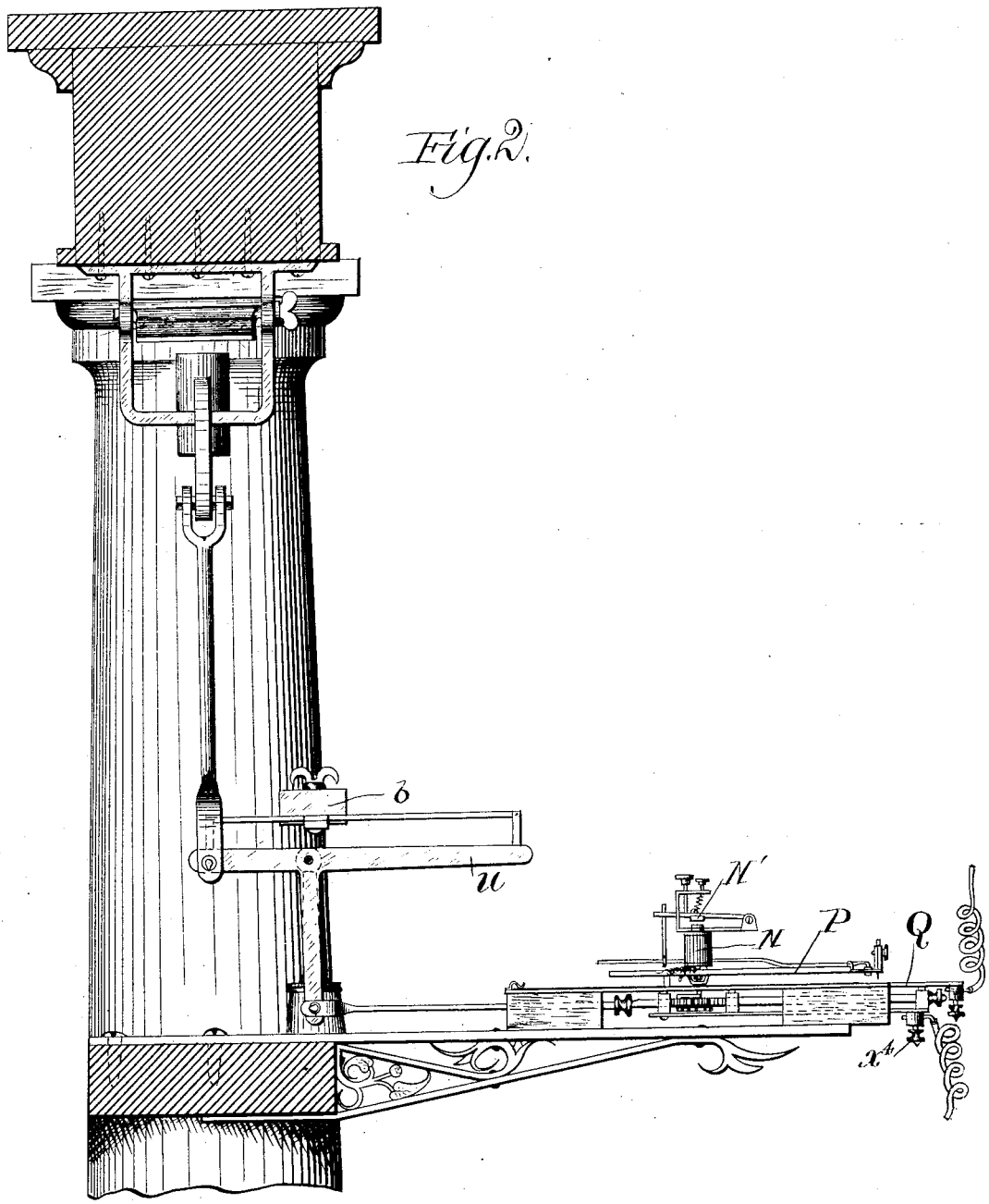

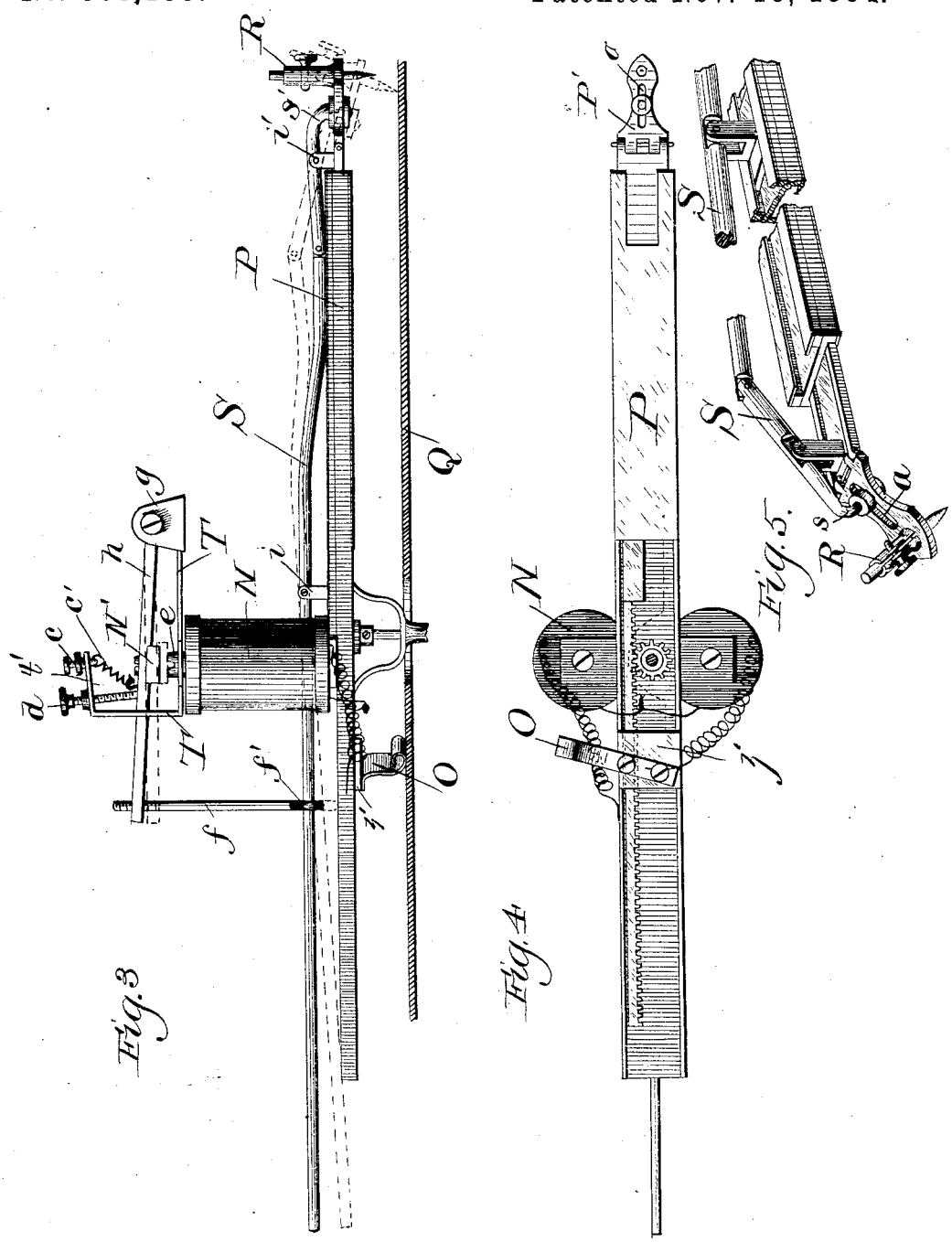

(No Model.) 4 Sheets—Sheet 4.
E. R. PUFFER.
SCALE.
No. 308,195. Patented Nov. 18, 1884.
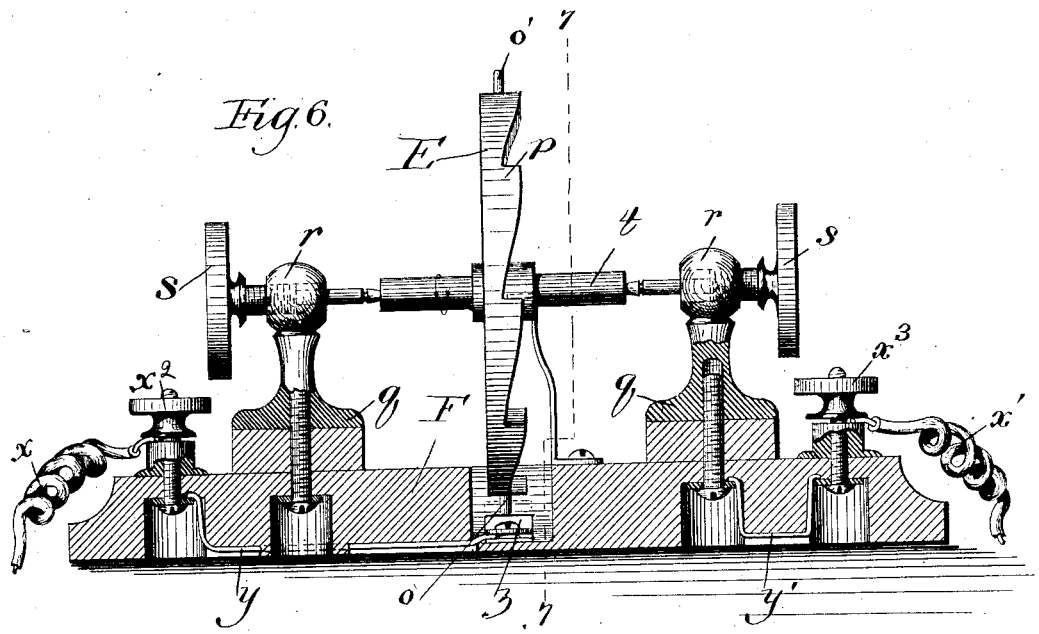
Fig. 6.
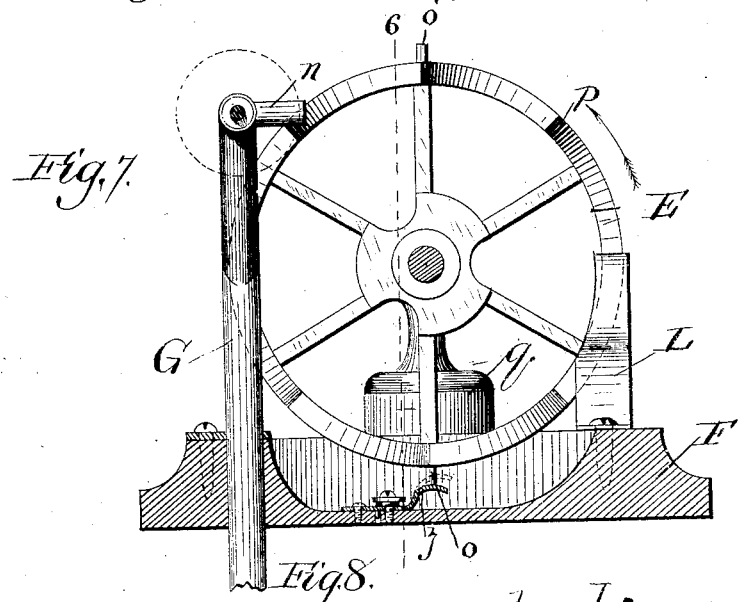
Fig. 7.
Fig. 8.
Witnesses:
Chas. E. Gaylord.
Douglas Dyrenforth
Inventor:
Edwin R. Puffer
By Dyrenforth & Dyrenforth
his Attorneys.

UNITED STATES PATENT OFFICE.

EDWIN R. PUFFER, OF RIVERSIDE, ILLINOIS.

SCALE.

SPECIFICATION forming part of Letters Patent No. 308,195, dated November 18, 1884.

Application filed October 20, 1883. (No model.)

*To all whom it may concern:*

Be it known that I, EDWIN R. PUFFER, a citizen of the United States, and a resident of Riverside, in the county of Cook and State of Illinois, have invented certain new and useful Improvements in Scales; and I hereby declare the following to be a full, clear, and exact description of the same.

My invention relates to an improvement to be used in connection with the device described and claimed by me in a former application for Letters Patent, filed July 5, 1883, the serial number of which is 100,102; and the object of my present invention is to provide means whereby the weight of a body moving across the platform shall be indicated, as described in my said former application, and in addition thereto automatically recorded upon a dial at the instant the body shall have reached a given point upon the platform.

To this end my invention consists in employing mechanism operating automatically to indicate upon a dial the weight of a body moving across the platform, and mechanism operating automatically to record upon the dial the weight of such moving body at the instant it shall have reached a given point upon the platform; and my invention further consists in employing a current of electricity to cause, through the medium of suitable mechanism, the weight of each car in a train, or of other bodies moving across the platform, to be automatically recorded upon a paper dial at the instant such car or other moving body shall have reached a certain point upon the platform.

My invention consists, further, in mechanism whereby the recording may be prevented at will; and my invention further consists in certain details of construction and combinations of parts, all as hereinafter more fully set forth and claimed.

In the drawings, Figure 1 is a perspective view of my invention applied to a platform-scale having a car-track lying across it for the passage of cars; Fig. 2, a transverse section through the upright frame of a platform-scale, showing a side elevation of one column thereof, and of my registering mechanism connected thereto. Fig. 3 is a vertical section taken through the dial at one side of the electro-magnet, showing a side elevation of the mechanism by means of which the index-finger is caused to act; Fig. 4, a bottom plan view of the said registering mechanism; Fig. 5, a perspective view showing sections of my sliding index-finger, and of the manner of attaching the horizontal compound lever, through which the recording end of the index-finger is controlled; Fig. 6, a sectional view taken on the line 6 6 of Fig. 7, viewed in the direction of the arrow-heads, and showing the mechanism by means of which the electric circuit is closed for the purpose of causing the weight of a single car to be recorded upon the paper dial; Fig. 7, a sectional view taken on the line 7 7 of Fig. 6; and Fig. 8, a transverse section of the rod which operates to turn the wheel by means of which the circuit is closed, showing the construction thereof whereby the said wheel may be prevented from turning.

To render my device for which the application for Letters Patent above referred to has been made still more advantageous in its adaptation to the purpose of measuring the weights of the cars in a moving freight-train, means whereby the weight of each car shall be automatically registered are very desirable, and even a necessity, where the speed of the moving train would prevent or produce inaccuracy in indicating the weights of the respective cars as they are recorded upon the dial-plate. To obviate this difficulty, and to provide a means whereby a single dial-card may be used to receive the record of the weights of all the cars liable to pass over the scale-platform during at least a whole day, I have invented the automatic mechanism of which the following is a description.

My former invention having been clearly described and shown in the application hereinbefore mentioned, it will be referred to in this connection only so far as it is necessary clearly to explain the operation of the device which forms the subject of the present application.

Although other means might be devised for the purpose, electricity is the medium preferred to be employed for operating the recording mechanism hereinafter described, and the following description is confined to the use of the same.

A is a compound lever, having its fulcrums in the bearings $v$, and lying underneath the boards between the scale-platform B and the scale-beam at right angles with the railroad-track C, laid lengthwise across the said platform. The said lever is provided near one end with a rod, D, projecting upward through a space provided between two sections of the rail, or, if desired, through a suitable opening formed in the said rail in such a manner that each wheel of the passing car will force the said lever down at both ends, the spring $u$ operating to throw it back into its normal position when released. The arms of the compound lever A may of course be so constructed and arranged that the relative distance passed through in a downward direction by each will greatly vary; but the arrangement I prefer to adopt is one which by allowing the rod D to project above the rail three-eighths of an inch its depression will force down the opposite end of the compound lever one and one-half inch.

E is a wheel formed of metal, and sustained in a vertical position upon the shaft $t$, passing through it, by the set-screws $s$, made pointed where they enter the shallow bearings, formed one on each end of the axle $t$ to diminish the friction, and passing in a horizontal direction toward each other through the internally-screw-threaded annular heads $r$ of the uprights $q$, formed on the frame-work or stand F. The said wheel E is provided on one edge of its periphery with shoulders $p$, eight in number, formed, as clearly shown in Fig. 6 of the drawings, preferably one and one-half inch apart. Directly opposite each other on the periphery of the wheel, forming right angles therewith, and dividing the number of shoulders $p$ into two sets of four each, are formed two projecting metallic pins, $o$ and $o'$.

G is a rod secured at one end in a vertical position to the end of the long arm of the compound lever A, and provided at its opposite end with a finger, $n$, forming a right angle with the said rod. The rod G passes upward through an aperture provided in the frame F, and through the ledge upon which the frame rests. The rod G has no lateral play, but has a vertical reciprocating movement controlled by the play of the long arm of the compound lever A, which in the present connection is one and one-half inch. The finger $n$ on the rod G is sufficiently long to allow for the arc described by the wheel in each eighth part of its revolution, and therefore remains in constant contact with the edge of the periphery of the wheel, when forced by lateral pressure against it by means of the mechanism formed upon the said rod to control the finger, and shown in section in Fig. 8 of the drawings, and to be hereinafter fully described.

It will be seen from the following description that the rod G forms the actuating medium between the scale-platform supporting the object of which the weight is to be recorded and the recording mechanism upon the dial-plate.

As hereinbefore stated, each of the four wheels on one side of a car will pass over the rod D and depress it four times, thus, through the medium of the compound lever A, pulling the rod G downward one and one-half inch also four times, or once for each wheel of the car. When the rod D shall have been depressed the fourth time, the full weight of the car will rest upon the scale-platform B, and the rod G, by the action of the intermediate mechanism hereinbefore described, will have been raised and depressed four different times, each time for the space of one and one-half inch, or the distance from shoulder to shoulder on the wheel E. The finger $n$ of the rod G is secured to one end of a horizontal rod, $m$, which passes backward through the annular head of the said rod G and terminates in a knob, H. A jacket, I, suitably braced by the oblique piece K, surrounds the rod $m$, inclosing a helical spring, $k$, around the said rod $m$, by the action of which spring the finger $n$ is kept in continual contact with the side of the wheel E. The jacket is provided with a slot, $l$, through which a stop projects to control the helical spring. It will thus be seen that each time the rod G is forced down by the action of the lever A the finger $n$, which, through the action of the helical spring $k$, remains in contact with and follows the outline of the side of the periphery of the wheel upon which the shoulders $p$ are formed, pulls the said wheel around one and one half inch, or the distance from shoulder to shoulder, and when the rod G is released from each successive wheel of a passing car and forced to its normal position by the action of the spring $u$ the rod G rises one and one half inch, engaging with the next shoulder on the wheel E, and so on till the operation has occurred four times, when the car will have been made to rest wholly upon the platform B. It should here be stated that the wheel E is prevented from revolving in an opposite direction to the one described by means of the click L, secured in position upon the base of the frame F, and extending upward a distance far enough to meet a shoulder, $p$. With the fourth partial revolution of the wheel E one of the metallic projections $o$ $o'$ will operate to close the circuit of an electric current generated by the battery M, and running therefrom along the wire $x$ to the binding-post $x^2$, thence, by means of the conductor $y$, Fig. 6, to the spring $z$, where the circuit is momentarily closed by the sliding of one of the projections $o$ or $o'$ upon the wheel E over the spring, which is located slightly in the rear of the point at which a pin, $o$ or $o'$, will reach its lowest point. The same result might be effected by locating the pins slightly to one side of a shoulder, $p$, and opposite each other, when the spring would occupy a position directly underneath the lowest point reached by the pins. The electric current then traverses the said wheel, reaching the insulated conducting-wire $x'$ through the metallic upright $r$, the conductor $y'$, and the binding-post $x^3$, whence it travels along the wire $x'$ to the binding-screw $x^4$, Fig. 2, and through the plate, which is carefully insulated and carries the mechanism which operates the spring underneath the metallic dial-plate, to the arbor, and upon the latter, by means of conducting-wires, to the electro-magnet N and armature N', whence it returns to the battery by means of the conductor $x^5$, Fig. 1, over the metal spring O, suitably insulated, as shown at $z'$, Fig. 4, from the index-finger P, and having contact with the dial-plate Q, as shown in Fig. 3 of the drawings, and over the said dial-plate to the return-wire, as before stated.

The next feature of my invention which requires description is the peculiar construction of the sliding index-finger P. This index-finger, which is formed in two parts—one moving longitudinally upon the other by means of a ratchet-and-pinion device—is provided at its registering extremity with an indicator, P', attached to the index-finger by means of a hinge-joint, as shown in Figs. 3, 4, and 5 of the drawings.

Near the end of the indicator P' there is formed a suitable recording device, R, for the purpose of producing a mark upon the paper or card-board dial, whereby the weight of the object upon the scale-platform B will be recorded.

S is a compound lever pivotally secured, like the lever A, within bearings $i$ and $i'$, formed upon the reciprocating portion of the index-finger, whereby the said lever may move longitudinally with the said reciprocating portion of the index-finger. The extremity $s'$ of the lever S is bent, as shown, to enter a slot, $a$, and is secured therein, the slot being formed longitudinally through the indicator P', in order that the lever may slide within the said slot, and thus avoid interference with the movement of the indicator P'. The armature N', Fig. 3, is attached transversely to the bar $h$, which is pivotally secured at one end within bearings formed in the shoe $g$, and at the opposite end it carries the downward-projecting arm $f$. The lower end of the arm $f$ is provided with an annular head, $f'$, which surrounds the lever S, and thus forms the connection between the lever S and the armature N'. Thus when the armature is attracted by the electro-magnet N the effect upon the indicator P' is to bring it to the position shown by the dotted lines in Fig. 3 of the drawings, by depressing the long arm of the compound lever S, whereby the point of the recording device R will be brought into contact with the paper dial. The frame T, formed of a strip of metal bent twice upon itself, as shown, is riveted at one end of its lower side to the shoe $g$, and toward the opposite end thereof it is provided with an opening, which is insulated and made to fit around the head of the screw $e$ in the top of the electro-magnet. Apertures are formed in the part $t'$ of the said frame to admit the regulating-screw $d$, by means of which the distance of the armature N' from the electro-magnet may be adjusted, and whereby, also, the play of the recording device R may be regulated to prevent its penetrating or marking more heavily than necessary upon the paper dial.

The set-screw $c$, which works in a second opening formed in the part $t'$ of the frame T, is provided to regulate the tension of the spring $c'$, by means of which the armature N' is withdrawn from contact with the electro-magnet N when the circuit is opened, and maintained out of contact therewith until the circuit is closed.

A general description of the operation of my device is as follows: With the arrival of the full weight of a car upon the platform, and not before, the index-finger will have revolved upon the dial-plate provided with numbers arranged upon a spiral, and have extended itself to bring its point to the number indicating the weight of the car, when at the same instant the circuit will be momentarily closed and the index-finger caused to record the weight by making a dot at the point where the weight is indicated. No matter what the speed of the train, the correct weight of each car in the train must necessarily be recorded. The beam, when used, does not require to settle instantaneously, as its vibrating end will have reached the highest point with the arrival of the full pressure of the weight upon the platform, which highest point will at the same instant have been recorded by the index-finger upon the graduated dial-plate; and though the friction of the point of the recording-pencil upon the dial may have the effect somewhat to reduce the vibrations of the beam, it is not necessary for the successful operation of the device that they shall be so reduced, as the attachment of the beam to the spring underneath the dial, which is necessarily stiff, will confine the vibrations between very narrow limits and rapidly bring the beam to a standstill, though if this do not occur before the arrival of the next succeeding weight or car upon the platform it will make no difference, because the weight to be indicated will move the beam to a much higher point than that attained in any of its residuary vibrations, and it will only be recorded when the full weight shall be upon the platform.

Reference has hereinbefore been made to an auxiliary purpose of the mechanism formed in connection with the finger $n$, Fig. 8. It is rarely desired to measure the weight of the locomotive drawing the train of cars; nor would it ordinarily be necessary to make any provision for the passage of the locomotive over the platform-scale, inasmuch as the cars are commonly backed across the platform; but the locomotive, having six wheels instead of four, like the freight-cars, should it ever cross the platform, it will easily be seen how my mechanism would be disorganized. To avoid this it is but necessary to pull out the knob H, whereby the finger n may be kept from contact with the wheel E, thus preventing the revolution of the latter, and released to fly back by the operation of the spring k when the locomotive has left the platform.

It is obvious that where the weights of vehicles having six or any other number of wheels are to be recorded, this may be done in the manner above described, it being necessary only to alter the size of the wheel E and the number of shoulders thereon, and to change the mechanism operating the wheel to correspond.

Mention has been made in several parts of the above description of a paper dial-plate. No such plate is shown separately in the drawings, as it is intended to correspond in every way, excepting as to the material of which it is composed, and the feature of its being removable, with the dial-plate described in my former application, above referred to, and the figures and lines upon the one coincide with those upon the other, though the metal dial-plate may be entirely dispensed with, a narrow metallic strip taking its place, and suitable mechanism being provided to receive and retain the paper or card-board dial, and to render the latter adjustable and detachable.

A set-screw is provided at one end of the dial device, as described in my previous application, for the purpose of regulating the spring which operates the index-finger. It may occasionally happen that a slight variation will occur in the tension of the said spring, which would necessitate readjustment and testing thereof. To obviate the trouble of readjustment, I have provided the auxiliary scale-beam U, with the sliding weight b, whereby the said spring may readily be equalized when there exists any slight variation in the tension thereof.

The foregoing description of my invention is confined to its purpose of indicating and recording the weight of each car of a train moving across the platform at the instant the car shall have reached a predetermined point upon the platform, and this limitation of the description is adopted partly for the sake of conveniently illustrating the principle of my invention and partly because such may constitute its most common application. I do not, however, intend to confine myself to the exact form of construction of each part of my device, nor to the particular purpose described for which it may be used, since slight modifications in certain parts will, without producing a departure from the spirit of my invention, adapt my device to indicate and record the weights of objects moving across the platform other than cars. The weighing of ice, for instance, is one of the various purposes for which it may be advantageously employed, when the only changes in the mechanism necessary to adapt it for the same would be to provide as many projections o o' upon the wheel E as there are shoulders, in order that the circuit may be closed whenever the object passes over the rod D, and the weight of the object instantaneously recorded. Of course there would be no necessity for a track upon the platform if the device should be used for weighing ice moved in blocks over it; but other provision could be made to insure the passage of each block of ice over the rod D, which should, for this and analogous purposes, project but a very slight distance above the surface of the platform, the lever which it operates being gaged accordingly, and could be beveled in a manner to prevent its offering an obstruction to the passage of the ice blocks.

As represented in the drawings, my invention is applied to a platform-scale of ordinary construction already in use, necessitating the employment of the dial mechanism as an auxiliary scale operated to indicate weights indirectly through the scale-beam by the mechanism underneath the scale-platform, and this construction is only necessary for the purpose of adapting my improvement to ordinary scales already constructed. When, however, scales shall be manufactured to embody my improvement, the scale-beam may be dispensed with and what is represented in the drawings as an auxiliary scale be applied directly to the mechanism underneath the platform.

What I claim as new, and desire to secure by Letters Patent, is—

1. In a scale, the combination, with the index-finger, of mechanism operating automatically to cause the said index-finger to indicate upon a dial-plate the weight of an object moving across the platform, and of mechanism operating automatically to record upon the dial-plate the weight at the instant the said object shall have reached a given point upon the platform, substantially as described.

2. In a platform-scale having a rigid car-track upon the platform, the combination, with the index-finger, of mechanism operating automatically to cause the said index-finger to indicate upon a dial-plate the weight of each car of a moving train, when each car shall be entirely upon the platform, and of mechanism operating automatically to record upon the dial-plate the weight of each car at the instant the last wheel shall have reached a given point upon the platform, substantially as described.

3. In a scale, the combination, with the index-finger, of mechanism operating to cause the said index-finger to indicate upon a dial-plate the weight of an object moving across the platform, and mechanism operated by an electric current to record upon the dial-plate the weight at the instant the said object shall have reached a given point upon the platform, substantially as described.

4. In a scale in which the weights are indicated by an index-finger vibrating upon a dial, the combination, with the index-finger, of apparatus in normally-open circuit with the said index-finger for generating electric currents, mechanism for opening and closing the circuit, and mechanism for causing the index-finger to record its position upon the dial at the instant of each closing of the circuit, substantially as described.

5. In a platform-scale for weighing wheeled vehicles, in which the weights are indicated by the vibration of an index-finger upon a dial, the combination, with the index-finger, of apparatus in normally-open circuit with the said index-finger for generating an electric current, mechanism operated automatically by the wheels of the vehicle passing over a given point in the platform, to close the circuit with the passage of the last wheel, mechanism for automatically reopening the circuit as soon as the last wheel has passed the given point, and mechanism for recording the position of the index-finger upon the dial-plate at the closing of the circuit, substantially as described.

6. In a platform-scale for weighing wheeled vehicles, in which the weights are indicated by means of an index-finger upon a dial-plate, and in which, when the entire vehicle is upon the platform, the index-finger records the weight upon the dial by the automatic closing of a normally-open electric circuit, the combination, with the platform B, rails C thereon, and spring $z$ in the electric circuit, of the following elements for automatically closing the circuit at the proper time—viz., a compound lever, A, resting in bearings $v$, a spring, $u$, to force the lever back into its normally-horizontal position when moved therefrom, rod D, secured to one end of the short arm of the compound lever, and projecting upward through one of the rails C, rod G, projecting upward from one end of the long arm of the compound lever A, and having a finger, $n$, and the wheel E, resting in suitable bearings, and provided with shoulders $p$, engaged by the finger $n$, and with pins $o$ and $o'$, substantially as described.

7. In a platform-scale for weighing wheeled vehicles in motion, the combination, with the wheel E in bearings upon a frame, and provided with pins $o$ and $o'$, of apparatus for generating an electric current, mechanism to form an electric circuit, opened and closed by the pins on the wheel E during the revolution of the said wheel, an index-finger, P, formed in two parts, one part moving longitudinally upon the other, a dial-plate, Q, mechanism operated by the pressure of the weight upon the platform to vibrate the lever S, supported by a frame, T, and bearings $i$ and $i'$, and indicator P', recording device R, operated through the medium of the said compound lever S by the electric current, and mechanism actuated by the wheels of the vehicle while passing over the platform for turning the wheel E, substantially as described.

8. In combination with the auxiliary scale-beam U of a platform-scale, the equalizing sliding weight $b$, as and for the purpose set forth.

9. In a platform-scale, the combination, with the lever A and wheel E, of the vertical rod G, horizontal rod $m$, suitably supported by the rod G, and provided at one end with a finger, $n$, and at the opposite end with a knob or handle, H, and spring $k$, confined between suitable stops, substantially as described, and for the purpose set forth.

EDWIN R. PUFFER.

In presence of—
L. R. PUFFER,
DOUGLAS DYRENFORTH.